United States Patent
Southern

(10) Patent No.: US 9,454,447 B2
(45) Date of Patent: Sep. 27, 2016

(54) METHOD AND A COMPUTING SYSTEM ALLOWING A METHOD OF INJECTING HARDWARE FAULTS INTO AN EXECUTING APPLICATION

(71) Applicant: FUJITSU LIMITED, Kawasaki-shi, Kanagawa (JP)

(72) Inventor: James Alastair Southern, Reading (GB)

(73) Assignee: FUJITSU LIMITED, Kawasaki (JP)

( * ) Notice: Subject to any disclaimer, the term of this patent is extended or adjusted under 35 U.S.C. 154(b) by 137 days.

(21) Appl. No.: 14/587,209

(22) Filed: Dec. 31, 2014

(65) Prior Publication Data

US 2015/0193319 A1    Jul. 9, 2015

(30) Foreign Application Priority Data

Jan. 6, 2014  (EP) .................................. 14150226

(51) Int. Cl.
  *G06F 11/00*   (2006.01)
  *G06F 11/263*  (2006.01)
  *G06F 11/22*   (2006.01)

(52) U.S. Cl.
  CPC ......... *G06F 11/263* (2013.01); *G06F 11/2242* (2013.01)

(58) Field of Classification Search
  USPC ........................................................ 714/41
  See application file for complete search history.

(56) References Cited

U.S. PATENT DOCUMENTS

| | | | |
|---|---|---|---|
| 6,477,666 B1 | 11/2002 | Sanchez et al. | |
| 7,165,189 B1 * | 1/2007 | Lakkapragada | .... G06F 11/2294 709/220 |
| 7,370,101 B1 * | 5/2008 | Lakkapragada | .... G06F 11/2294 709/223 |
| 7,757,215 B1 * | 7/2010 | Zhou | .................... G06F 11/3644 714/2 |
| 2004/0194063 A1 | 9/2004 | Pereira | |
| 2004/0243882 A1 | 12/2004 | Zhou | |
| 2011/0239048 A1 * | 9/2011 | Andrade | ............. G06F 11/3616 714/35 |
| 2011/0246831 A1 * | 10/2011 | Das | ........................ G06F 17/504 714/37 |
| 2013/0262938 A1 * | 10/2013 | Schmitt | ................. G06F 11/085 714/48 |

FOREIGN PATENT DOCUMENTS

| | | |
|---|---|---|
| CN | 102354298 | 2/2012 |
| EP | 2 565 790 A1 | 3/2013 |

OTHER PUBLICATIONS

European Search Report Mailed Sep. 19, 2014 in corresponding European Application 14150226.0.

D. Stott, "NFTAPE: Networked Fault Tolerance and Performance Evaluator" IEEE, 2002.

(Continued)

*Primary Examiner* — Sarai Butler
(74) *Attorney, Agent, or Firm* — Staas & Halsey LLP

(57) ABSTRACT

A method of injecting hardware faults into execution of an application in a distributed computing system comprising hardware components including linked nodes, the method comprising: loading an enhanced software stack allowing faults to be injected by deactivating or degrading hardware components as a result of fault triggers; running a fault-trigger daemon on each of the nodes; providing the fault trigger for a degradation or deactivation using one of the daemons to trigger a layer of the software stack controlling a hardware component to inject a fault into the hardware component; and continuing execution of the application with the injected fault.

17 Claims, 6 Drawing Sheets

(56) References Cited

OTHER PUBLICATIONS

Dawson, Farnam, Mitton; "ORCHESTRA: A Fault Injection Environment for Distributed stributed Systems" 1996.

Chandra, Lefever, Joshi, Cukier, Sanders; "A Global-State-Triggered Fault Injector for Distributed System Evaluation" IEEE Transactions on Parallel and Distributed Systems, vol. 15, No. 7, Jul. 2004, pp. 593-605.

Kao, Iyer; "DEFINE: A Distributed Fault Injection and Monitoring Environment" IEEE 1995, pp. 252-259.

Blough, Liu; "FIMD-MPI: A Tool for Injecting Faults into MPI Applications" IEEE 2000.

Weatherly, D.K. Lowenthal, Nakazawa, F. Lowenthal; "Dyn-MPI: Supporting MPI on medium-scale, non-dedicated clusters" Elsevier Journal of Parallel and Distributed Computing, 2006, pp. 822-838.

* cited by examiner

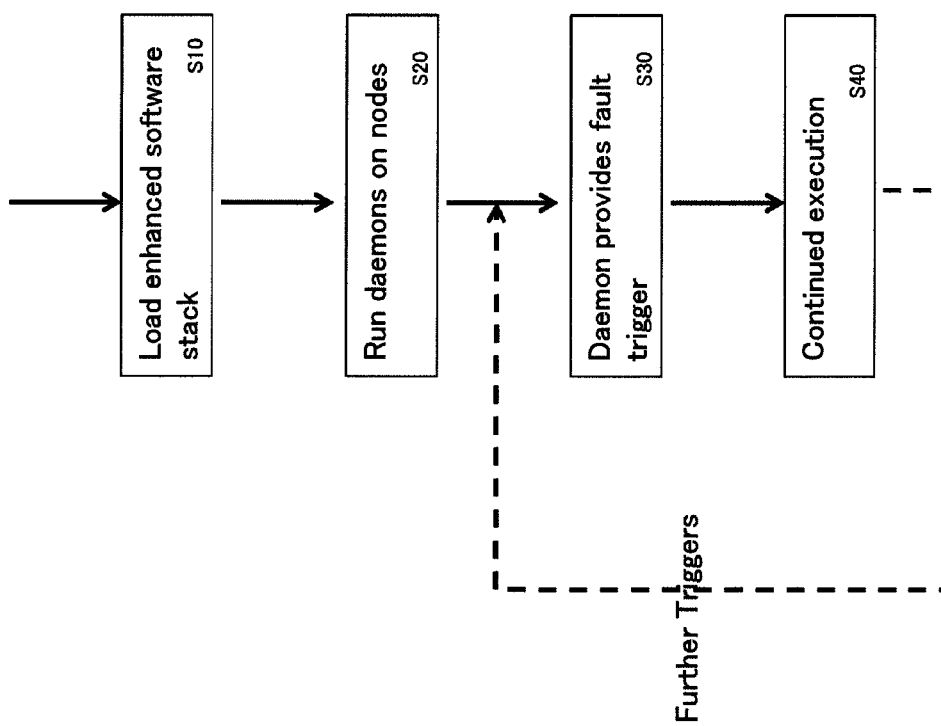

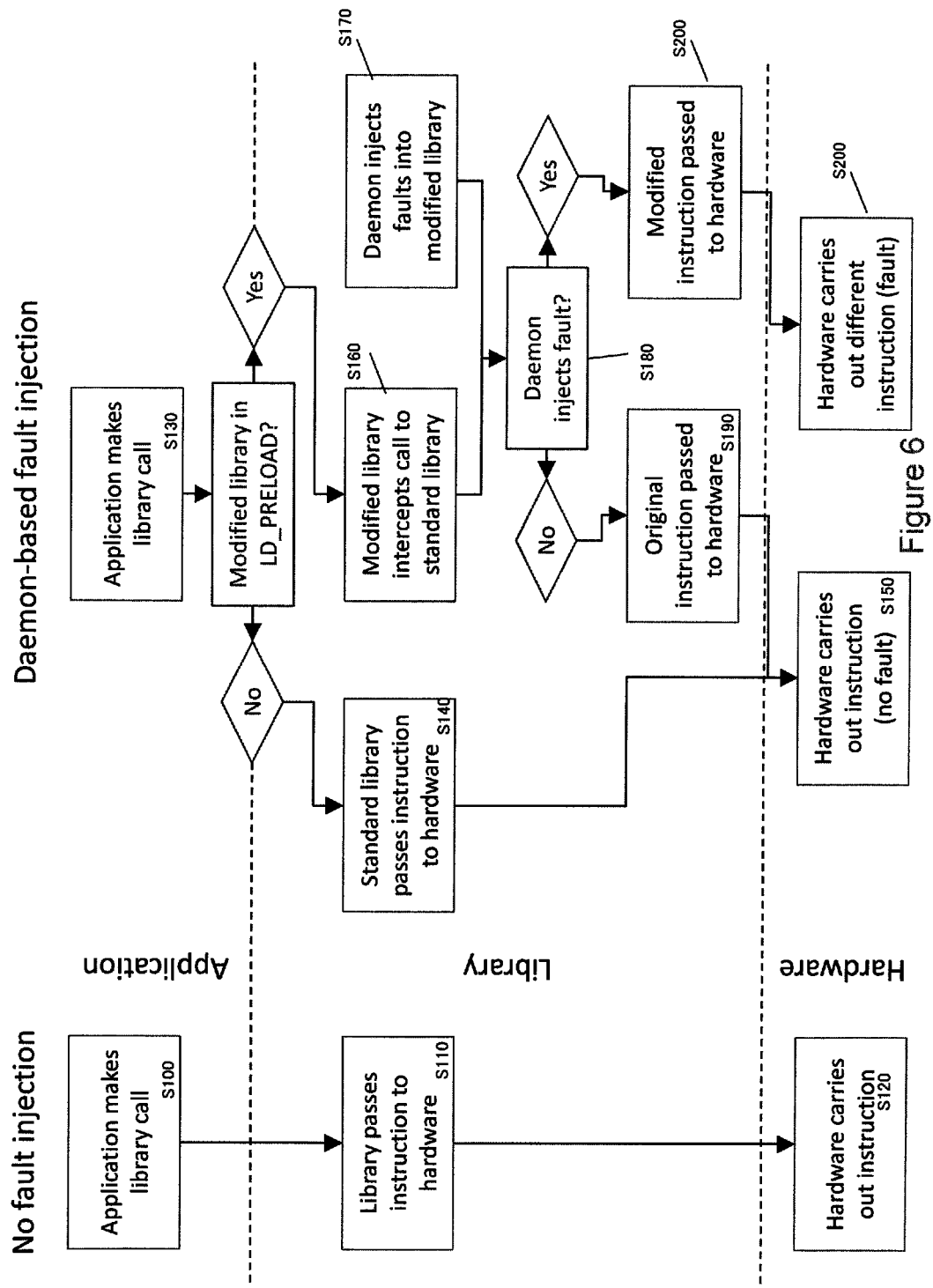

METHOD AND A COMPUTING SYSTEM ALLOWING A METHOD OF INJECTING HARDWARE FAULTS INTO AN EXECUTING APPLICATION

CROSS-REFERENCE TO RELATED APPLICATIONS

This application claims the benefit of European Application No. 14150226.0, filed Jan. 6, 2014, in the European Intellectual Property Office, the disclosure of which is incorporated herein by reference.

BACKGROUND

The present invention relates to a way of emulating faults that are expected in a computer system, such as a high-performance computer system (HPC system) and which occur while an application is executing. This kind of method is referred to herein as fault injection, which essentially equates to insertion of "artificial" errors in the execution of the application.

The present invention finds application particularly in the field of fault-resilient distributed computing, with emphasis on the testing of new algorithms for use on exascale computers.

Fault-resilient computer programs are required in a wide range of application areas, for instance from simple computations to image rendering and large-scale, complex simulations, including on-the-fly and offline processing. As one important example, mission-critical jobs (e.g. operational weather forecasting) or systems (e.g. the internet) must be resilient to failure. This invention addresses the whole gamut of these application areas.

Computationally intense applications are usually carried out on HPC systems, which often provide distributed environments in which there is a plurality of processing units or cores on which processing threads of an executable can run autonomously in parallel.

Many different hardware configurations and programming models are applicable to high performance computing. A popular approach to high-performance computing currently is the cluster system, in which a plurality of nodes each having one or more multicore processors (or "chips") are interconnected by a high-speed network. Each node is assumed to have its own area of memory, which is accessible to all cores within that node. The cluster system can be programmed by a human programmer who writes source code, making use of existing code libraries to carry out generic functions, such as hardware control. The source code is then compiled to lower-level executable code, for example code at the ISA (Instruction Set Architecture) level capable of being executed by processor types having a specific instruction set, or to assembly language dedicated to a specific processor. There is often a final stage of assembling or (in the case of a virtual machine, interpreting) the assembly code into executable machine code. The executable form of an application (sometimes simply referred to as an "executable") is run under supervision of an operating system (O/S) and uses the O/S and libraries to control hardware. The different layers of software used may be referred to together as a software stack.

The term "software stack" as used herein includes all the software required to run an application, including the base level software (the operating system or O/S); libraries interfacing for example with hardware components such as an interconnect between nodes, a disc or other memory etc (also a type of system software) and the application itself. The application currently executing may be seen as the top layer of the software stack, above the system software.

Applications for computer systems having multiple cores may be written in a conventional computer language (such as C/C++ or Fortran), augmented by libraries for allowing the programmer to take advantage of the parallel processing abilities of the multiple cores. In this regard, it is usual to refer to "processes" being run on the cores. A (multi-threaded) process may run across several cores within a multi-core CPU. One such library is the Message Passing Interface, MPI, which uses a distributed-memory model (each process being assumed to have its own area of memory), and facilitates communication among the processes. MPI allows groups of processes to be defined and distinguished, and includes routines for so-called "barrier synchronization", which is an important feature for allowing multiple processes or processing elements to work together.

Alternatively, in shared-memory parallel programming, all processes or cores can access the same memory or area of memory. In a shared-memory model there is no need to explicitly specify the communication of data between processes (as any changes made by one process are transparent to all others). However, it may be necessary to use a library to control access to the shared memory to ensure that only one process at a time modifies the data.

Exascale computers (i.e. HPC systems capable of 1 exaflop (1018 floating point operations per second) of sustained performance) are expected to be deployed by 2020. Several national projects to develop exascale systems in this timeframe have been announced. The transition from petascale (current state-of-the-art, approximately 1015 flops) to exascale is expected to require disruptive changes in hardware technology. There will be no further increase in processor clock frequency, so the improved performance will result from an increase in parallelism or concurrency (possibly up to approximately 1 billion cores). The requirement to keep the power usage of an exascale system within an acceptable window means that low-power (and low-cost) components are likely to be used, resulting in a reduced mean-time-to-failure for each component. Thus, an exascale system will contain many more components than today's state-of-the-art systems—and each component is likely to fail more frequently than its equivalent today. It is likely that the mean-time-to-component-failure for an exascale system will be measured in minutes (as opposed to days for current systems).

Therefore, exascale software in particular requires the ability to continue to run through component failure, although this is also a requirement for all other systems, especially HPC systems, whether using shared or distributed memory. The development of new algorithms that are capable of doing this is a topic of ongoing research. In order to test these new algorithms robustly it is useful to run them on a present day distributed system and in the presence of faults. As even the largest current systems typically see intervals of days between component failures it is can be appropriate to artificially inject faults in order to carry out this testing.

The need to artificially inject faults is not new and several classes of fault injection techniques exist. These include:
  Hardware-based fault injection: achieved at the physical level by altering the environment of the system to make faults more likely, e.g., power supply disturbances, exposure to heavy ion radiation or electromagnetic interference or laser fault injection.

Software-based fault injection: achieved by reproducing the effects of potential hardware failures in software.

Simulation-based fault injection: achieved by creating a model of a potentially faulty system, including a statistical model of the failures that are expected to occur.

Emulation-based fault injection: enhancement to simulation-based fault injection that emulates a faulty system at the circuit level on an FPGA (field-programmable gate array) and then injects these into a host system.

However, each of these prior art techniques has deficiencies and thus it is desirable to provide an alternative way of achieving fault injection.

According to embodiments of one aspect of the invention there is provided a method of injecting hardware faults into execution of an application in a distributed computing system comprising hardware components including linked nodes, the method comprising loading an enhanced software stack allowing faults to be injected by deactivating or degrading hardware components as a result of fault triggers; running a fault-trigger daemon on each of the nodes; providing the fault trigger for a degradation or deactivation by using one of the daemons to trigger a part of the software stack directly controlling a hardware component to inject a fault in that hardware component; and continuing execution of the application with the injected fault.

Thus invention embodiments use a daemon (a background level program not under user control) for fault injection. This daemon-based methodology can be seen as an intermediate position between the prior art software-based fault injection and the prior art hardware-based fault injection.

In invention embodiments, the software stack loaded is an enhanced software stack which is modified with respect to the standard parts (or libraries) of the software stack to allow faults to be injected. The modification is only to the stack below the application layer.

The faults can comprise deactivation (or switching off) of one or more hardware components or degrading of one or more hardware components, for example by reducing the speed or other performance attribute of the component(s) in question. A single daemon operable to trigger faults runs on each of the nodes and the application continues execution despite the injected fault.

Invention embodiments are implemented in software, but intended to act independently of the application code under evaluation and to have the ability to effectively inject faults directly into hardware to deactivate or otherwise degrade a hardware component. The embodiments can use the parts of the software stack that directly control the hardware to change the way the hardware will respond when the application is executed. Thus, the embodiments are not closely related to simulation- or emulation-based techniques and differ from hardware-based methods in the method of injecting faults and from software-based methods primarily in the location of the faults injected. The main limitations of existing software-based methods are generally a requirement for close integration with the application (either source code modification or changes to the way in which the application is run, e.g. the use of a debugger), an inability to inject the complete range of faults that may be experienced in an exascale system (generally messages may be intercepted and modified, but there is no facility to test complete failure—and potential recovery—of a node) and/or the need to run heavyweight tools across the whole system in a way that will not scale.

Advantageously in some invention embodiments, each daemon runs as a background process on its node within the operating system. Thus the solution is scalable and no source-code modifications are required in the application to be tested.

Thus preferably, the fault is injected completely independently of the application execution, since it is provided separately from the execution, and at a different level in the software stack.

The daemon may operate in any suitable way to trigger the fault. In some embodiments, the enhanced software stack includes an enhanced version of a library for the application and the daemon triggers the enhanced library controlling the hardware to inject the fault. For example, the library may contain standard instructions and one or more alternative instructions for the hardware, which introduce a fault and the alternative instructions may effectively be selected by the daemon to trigger the fault.

As one example, an MPI or interconnect library in the enhanced software stack may include functionality to allow injection of faults via the daemons.

In other embodiments, which may be freely combined with the previous embodiments (so that different faults may be injected in parallel and sequentially), the enhanced software stack includes an enhanced version of the operating system for the application and the daemon triggers the operating system controlling the hardware to inject the fault (potentially a different fault from a fault injected by another trigger).

In such examples, the operating system itself is triggered. Wherever the fault occurs, it is triggered by the daemon, which then interacts with the part of the software stack (for example the modified library or operating system) that controls that hardware in order to alter the behaviour of the hardware.

For the maximum flexibility and to cover all classes of faults, both the operating system and any applicable libraries can be enhanced. However, in some cases a daemon can simply trigger a standard (non-enhanced) operating system to take action (or omit action) which requires no modification to the operating system. Thus the part of the software stack in which a particular fault is injected need not be enhanced for some types of fault. However, other faults will require enhancement of the software stack for injection. Thus the software stack will always be enhanced, to provide a wide range of faults and give a realistic testbed.

Whether the operating system or library is used in the fault trigger may depend on whether the hardware is primarily controlled by the operating system, (which is more likely for parts physically located on the nodes such as the memory or the CPU) or by a library (which is likely to be the case for parts not physically located on the node such as the interconnect and possibly network memory).

There may be some link between the daemons and there may also be some element of central control, but preferably the daemons run independently of each other and independently of any central control. This provides an accurate model of hardware faults. It is also minimally invasive and scalable. Thus each node may only become aware of a fault injected elsewhere by failed communication.

Also, the daemons may be controlled by any suitable method. For example, they may be controlled by one or more files indicating what faults should be injected on the nodes on which they are running. The timing of faults may also be indicated so that the file(s) show what faults are injected when. Each daemon could be sent a different input file or they could all parse a single file for relevant information and thus the need for a central controller is obviated.

The daemon can keep a record of what fault it injects when, particularly if the controlling file or files do not give a timing indication of when faults are to be injected or when there is no controlling file arrangement.

Thus each daemon may determine when a fault occurs, preferably using a statistical model.

One important example of a part of the hardware which may be affected by faults is the interconnect. Thus in addition or alternatively to being able to control the operating system to inject the fault, advantageously each daemon can control an enhanced message interface, such as an enhanced MPI and/or other enhanced interconnect layers to inject the fault.

The daemon need not take any further action in respect of the particular fault after its injection. However in some embodiments, a daemon can provide a recovery trigger after the fault trigger to instruct a recovery of the degraded or de-activated hardware component. Advantageously, the recovery trigger is provided by the daemon after a time delay. For example, the time delay may reflect the delay after which a hardware fault might be automatically resolved, for instance by rebooting of a node, to recreate a fault from which a hardware component may recover.

As a result of the use of the daemons and use of an enhanced software stack in which software below the application level only is modified, the fault injection may be carried out without modification to the source code of the application and without modification to any of the configuration, compilation and execution of the application.

The skilled person will appreciate that the operating system and libraries controlling interconnect layers as well as other parts forming the software stack may be distributed within the system or stored on a physical storage medium or downloaded. Equally, the daemon may be distributed in any way and preferably in the same way as the software stack.

As mentioned above, the enhanced software stack may be provided in any suitable way. In one embodiment, the enhanced software stack is loaded statically or dynamically, for example by a dynamic linker using a modified list of locations, specified, for example by LD_PRELOAD, to search for libraries. LD_PRELOAD is a list of locations used by the dynamic linker of the search libraries. The locations of the enhanced libraries are specified to the linker using LD_PRELOAD.

The purpose of LD_PRELOAD and equivalents is to ensure that the linker looks in these locations first (before the system libraries) allowing the invention to override any functions that are used to control the hardware, no matter when the libraries that contain them would otherwise have been loaded. Further, the libraries specified by LD_PRELOAD need only contain the modified functions for injecting faults. For all other functionalities the application can fall back on the "standard" library, with the location as specified by the standard list of locations LD_LIBRARY_PATH.

According to an embodiment of a further aspect of invention there is provided a distributed computing system comprising hardware components and a software stack allowing a method of injecting hardware faults into an executing application; the distributed computing system comprising: nodes linked to an interconnect; an enhanced version of a software stack for the application, which is operable to allow one or more hardware components to be deactivated or degraded following a fault trigger; and a daemon associated with each single node; each daemon being operable to provide a fault trigger for a degradation or deactivation by triggering a layer of the software stack controlling a hardware component to inject a fault into the hardware component.

In this context, the distributed computing system includes hardware, as well as a software stack currently provided for the hardware.

This aspect refers to a distributed computing system including nodes linked to an interconnect, however the skilled person would appreciate that the method of injecting hardware faults is applicable to any computing system including hardware such as linked nodes. The only requirement of the system is that it is able to act as a testbed for assessing fault resilience of the application.

According to an embodiment of a still further aspect of the invention there is provided a fault-trigger daemon operable on a single node of a distributed computing system comprising hardware components including linked nodes, the computing system being arranged to carry out a method of injecting hardware faults into execution of an application, wherein the daemon is operable to provide a fault trigger for a degradation or deactivation of a hardware component, by triggering a part of the software stack to deactivate or degrade a hardware component that it (the part of the software stack) is controlling.

According to an embodiment of a yet further aspect of the invention there is provided a software stack for use with an application and including an operating system layer and at least one library layer controlling hardware of a distributed computing system comprising hardware components including linked nodes, wherein the library layer and/or operating system are enhanced to allow injection of hardware faults into execution of the application using a fault-trigger daemon operable on a single node of the computing system which provides a fault trigger for a degradation or deactivation of a hardware component.

Individual features and sub-features of each of the aspects may be provided in the other aspects. Thus for example, the preferred method features set out hereinbefore may be applied to the distributed computing system and/or the fault-trigger daemon and/or the enhanced software stack as described above.

The method steps may be carried out in a different order from their definition in the claim and still achieve desirable results. For example, with a dynamic linker, some or all of the software stack can be loaded dynamically during execution of the application and thus timing of this step may be before the daemons are running, or while the daemons are running.

BRIEF DESCRIPTION OF THE DRAWINGS

Reference is made, by way of example only, to the accompanying drawings in which:

FIG. 5 is an overview flow diagram showing the processes carried out in a method according to invention embodiments; and FIG. 6 is a set of two parallel flow charts illustrating the difference between daemon-based fault injection according to invention embodiments and a scenario without fault injection.

DETAILED DESCRIPTION

The latest generation of supercomputers contain hundreds of thousands or even millions of cores. The four systems on the November 2013 TOP500 list with sustained performance over 10 Pflop/s contain 3,120,000 (Tianhe-2) 560,640 (Titan), 1,572,864 (Sequoia) and 705,024 (K computer) cores (http://www.top500.org/list/2013/11/). In moving from petascale to exascale, the major performance gains will result from an increase in the total number of cores in the system (flops per core is not expected to increase) to 100 million or more. As the number of nodes in the system increases (and especially if low-cost, low-energy nodes are used to maintain an acceptable power envelope) the mean-time-to-component-failure of the system will decrease—eventually to a time shorter than the average simulation run on the system. Hence, it will be necessary for software and especially exascale software to be resilient to component failure.

Exascale and other systems will consist for example of a variety of nodes, networked together via an interconnect. As the total system becomes larger, faults may occur at any part of it and it will be necessary for the software that is to be run on exascale systems to be able to deal with any of these faults. Note that the faults which the application should be resilient to include (but are not limited to) complete failure of a component, failure of some parts of the component that reduce its functionality or performance degradation of a component.

Figure 1:
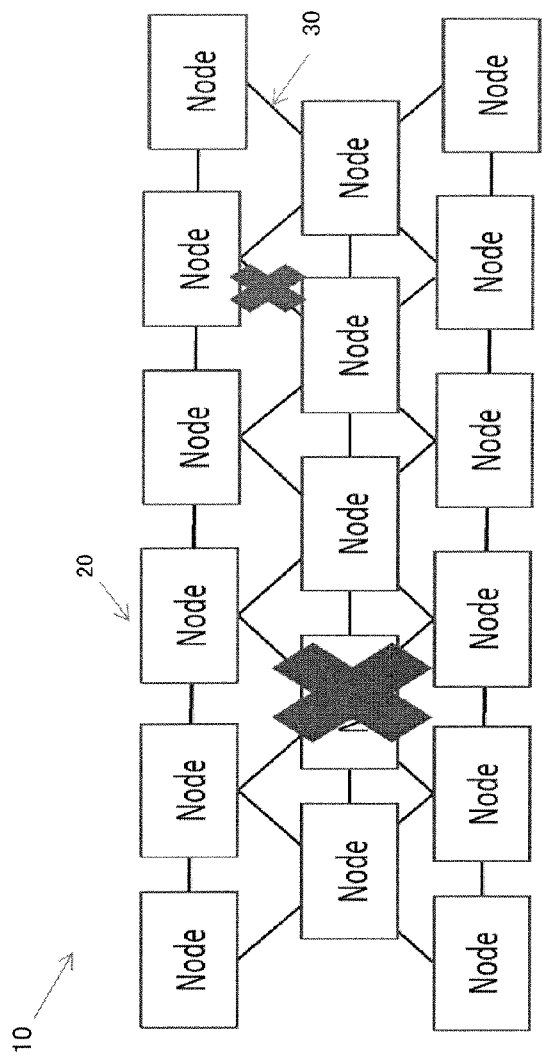
FIG. 1 is a schematic diagram of a distributed computer system.

FIG. 1 is an overview of a distributed computer system 10 that may experience faults. The system is distributed in that it consists of a large number of nodes 20 connected by an interconnect 30. The interconnect may include redundancy, i.e. messages can be passed between any two nodes by more than one route. Applications, particularly at exascale, will need to be resilient to faults (shown by crosses) in individual nodes, in the interconnect, and in any other component of the system (e.g. I/O, disk). Faults may include complete failure of a component, failure of some parts of the component that reduce its functionality or other performance degradation of a component.

It is important to develop the methods required to make software resilient to component failure before exascale systems are available on which to run the software (in order to ensure that the systems are ready for productive use as soon as they are deployed). However, even the largest current systems do not experience faults anywhere near as frequently as exascale systems are predicted to. Thus, it is important to develop a testbed on which to evaluate fault-resilient algorithms in advance of their deployment at exascale. The inventor has realised that it is desirable to propose a software-based method for injecting faults into a test system which is independent of any running application and produce faults that are preferably indistinguishable to those applications from the hardware component failures that will be experienced at exascale (or in other complex systems). This may enable reliable testing of a range of possible fault-resilient programming algorithms and allow their effectiveness to be compared without the need to re-implement synthetic faults within each software package to be evaluated.

Technical Issues

The main technical issue relating to the problem identified by the inventor is how to most effectively inject faults into the system in order to accurately recreate the experience of running an application, for example on an exascale system?

It is not desirable to physically damage components of the test system while developing and testing applications. This rules out the use of hardware-based fault injectors for testing the development of new algorithms (although these may be appropriate in the final testing phase of completed algorithms immediately before deployment, when only a limited number of components will be damaged). Simulation- and emulation-based methods are not appropriate for the general case as they target specific systems (which are either simulated or emulated). Further, in the case of simulation-based methods, the simulated system will run very much more slowly that the real system it is intended to simulate, making execution of a real application within the simulation time consuming.

Thus, the use of software-based methods is preferred for use in previous embodiments and the technical issues have been determined as identifying the appropriate level of the software stack for the fault injector to be located and the optimal methodology for implementing realistic faults. Ideally a solution should have some or all of the following properties:

Invisible to the application software: preferably the application should not need to be compiled or run differently from how it would be run on the exascale system being targeted.

Cover all classes of faults: a solution could advantageously be flexible enough to be capable of reproducing any type of fault that may be experienced on an exascale system, including node failure, loss of messages and degradation of performance in any component—ideally with these faults capable of occurring at any time. Thus, an ideal situation would have the ability to control the hardware on which the application is running.

Low performance overhead: the performance impact of adding fault-resilience into an application should ideally be quantified, and the fault injection method should advantageously not significantly alter the run-time of the application.

Scalable: exascale applications require testing on large systems, so the fault injection method would advantageously be capable of running simultaneously across a plurality of computational nodes.

Reproducibility: once a failure that has an adverse impact on an application has been identified it is desirable to be able to reproduce it on demand in order to test potential modifications that are intended to make the application resilient to that fault.

Current State-of-the-Art

The current state-of-the-art for software-based fault injection appears to consist of two basic sub-classes of methods. The first (and simplest) method of injecting faults is to modify the application software to include a statistical model of potential faults that may be experienced and alter the behaviour of the running application to that which may result from the occurrence of those faults (for example, messages may not be sent, to simulate the failure of an interconnect, or an MPI process may be terminated to simulate failure of a node).

Figure 2:
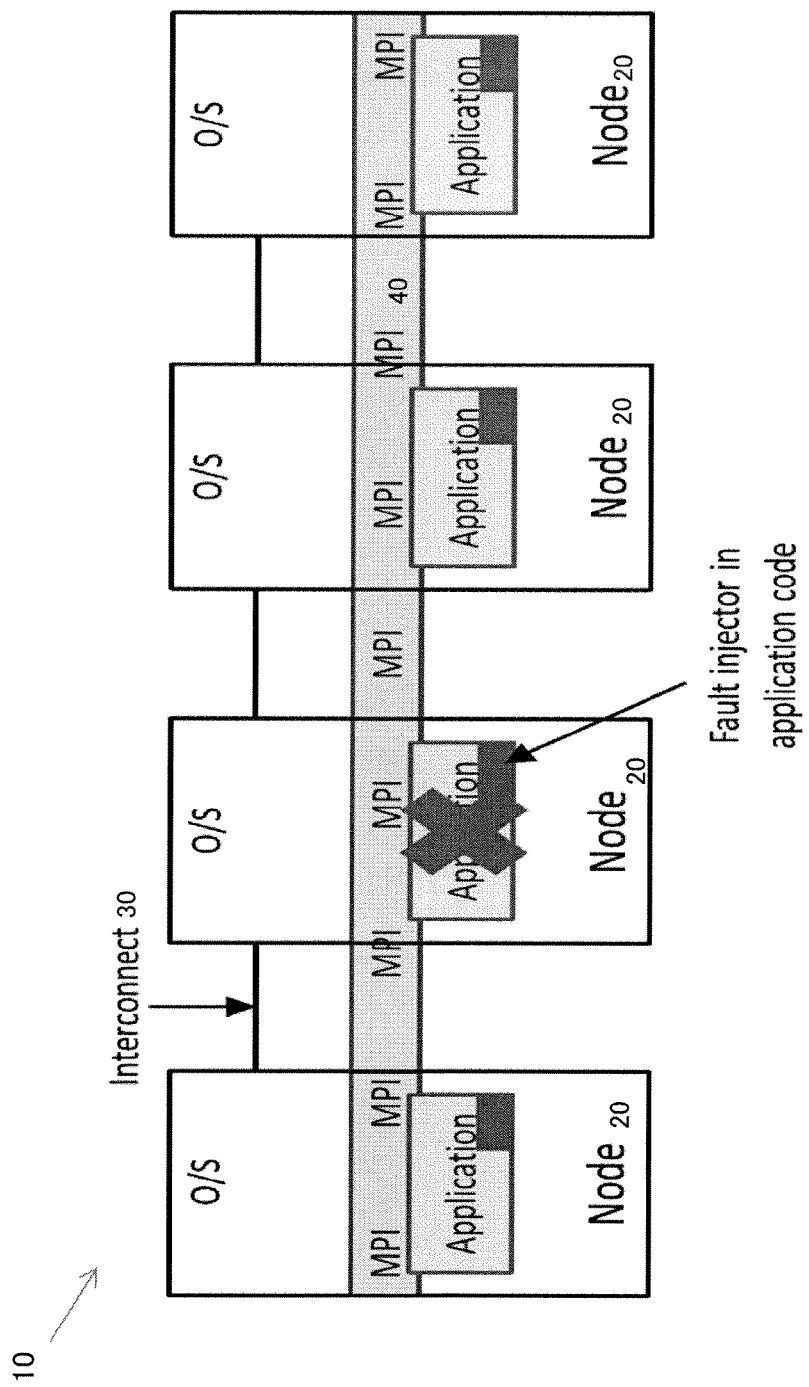
FIG. 2 is a schematic diagram of nodes and an interconnect illustrating a software-based fault tolerance test bed.

FIG. 2 depicts a generic prior art software-based fault tolerance functionality embedded within the application to be tested. The schematic diagram shows four only of numerous nodes 20 of a distributed system 10, connected by an interconnect 30. The diagram shows part of the software stack by inclusion of the operating system (O/S) and of an MPI layer used to pass messages and included within and between each of the nodes. The MPI library layer is labeled as 40 in the figure. The application executing on the nodes is shown at each node, with a block in the lower right hand corner in which a fault has been injected within the application code. The application source code is modified to include a statistical model of potential faults that may be experienced and alter the behaviour of the running application to that which may result from the occurrence of those faults.

This prior art method ensures that the impact of a fault on an application is reproducible (as the application controls when it occurs during execution) and is likely to have a low overhead and be scalable. However, it fails to satisfy several of the desirable properties listed above. Most notably, the method is not invisible to the application—indeed, it requires significant modification to the source code as the entire characterization of any fault must be added to the application source code (and this must be repeated for any new application that is to be tested). The method is also unlikely to cover all classes of faults occurring at any time during execution: faults can only occur when the application is executing parts of its source code that have been modified to include injected faults. Since most applications include several phases of execution, it is unlikely that all will have been modified—and, further, it is likely to be very difficult to cover faults that occur at interfaces between two different phases of execution. Further, the faults injected in this method are not sufficiently varied to portray a real life scenario: the application does not have access to a sufficiently wide part of the software stack to, e.g., reboot a node or intercept a message between it being sent from one node and received on another. A better solution might be decoupled from the application software. This could:

Require the application to be able to respond to any or at least most faults that occur, rather than allowing it to inject its own faults at times that are convenient to it.

Provide a generic solution that can be run alongside any application, rather than requiring simulated faults to be added to each application of interest individually.

Figure 3:
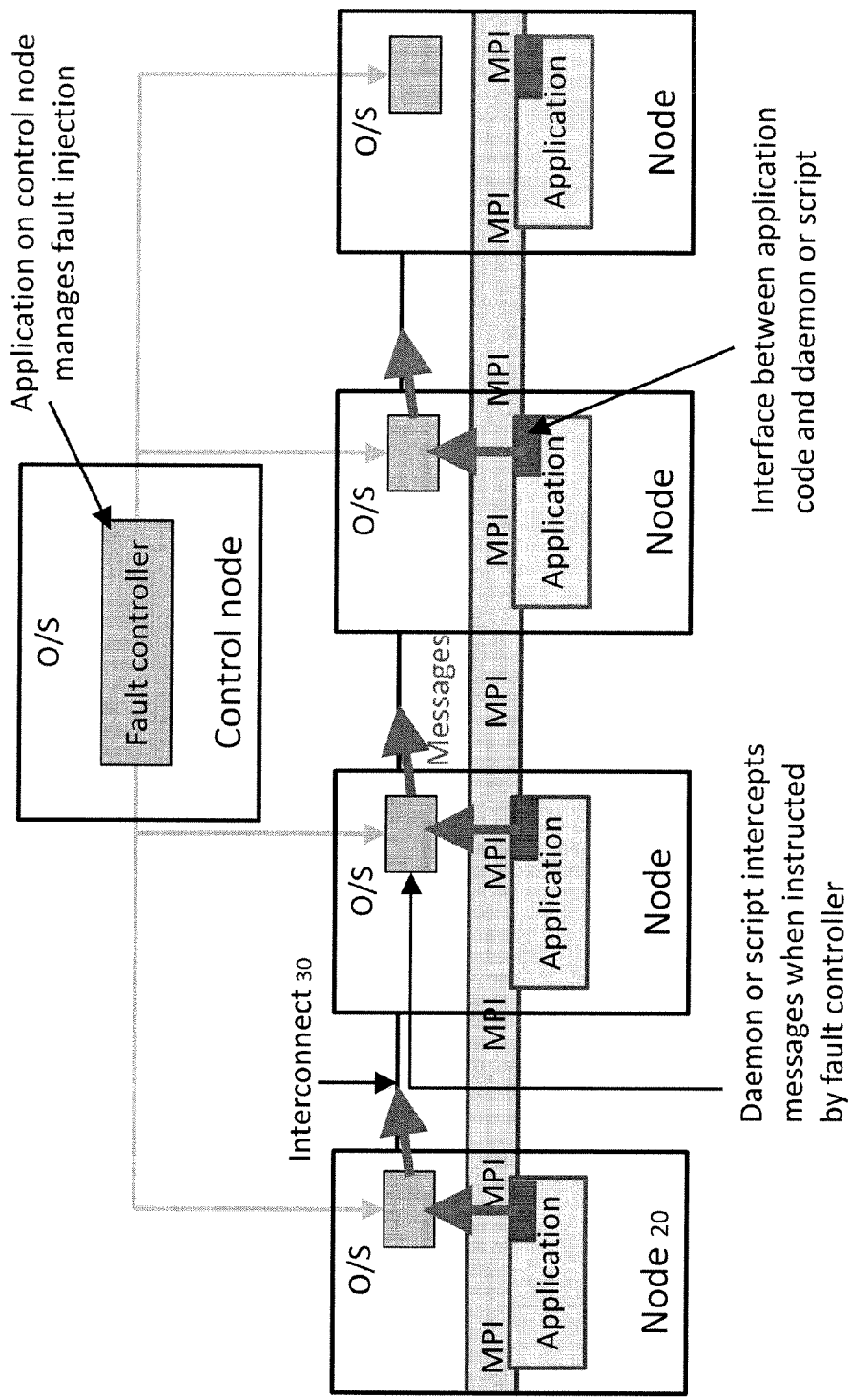
FIG. 3 is a schematic diagram of nodes linked by an interconnect illustrating a method of fault injection by message capture.

FIG. 3 depicts an overview of a possible method for fault injection by message capture, with the same overall hardware and software stack as shown in FIG. 2. Further description thereof is omitted for brevity. Daemons or scripts running on each node capture the messages to be sent by the application code and selectively inject faults into them. In many (but not all) cases, fault injection is controlled from a separate control node.

This second class of fault injection methods is primarily focused on intercepting (and potentially modifying) messages passed between nodes (although some can also inject other types of fault). These methods use scripts or daemons at the operating system (O/S) level to manage the message passing process. A statistical model determines when a fault is to be injected and the script or daemon then modifies (or deletes or delays) the message before it is transmitted to its destination. The messages are shown in FIG. 3 as thicker arrows, with the central control represented as paler arrows to each node. Here, the daemon or script interfaces directly with the execution of the application by intercepting the messages. Thus these methods do not deactivate or degrade the performance of hardware components themselves, but only intercept messages sent between hardware components.

In contrast, methods according to invention embodiments provide a fault trigger to the relevant hardware component for example via the operating system or a library of the software stack, without any interaction with the application code or specific effects of application execution itself.

The message interception methods are generally more generic and portable than the application-based techniques considered above and they can encapsulate a wider range of faults (as they run within the O/S, rather than the application). However, they do have some serious limitations compared to the invention embodiments. These can include:

Many of the methods require modification either to the source code or the method of running an application (e.g., in order to allow the daemon or script to intercept messages before they are sent).

These methods focus primarily focused on "soft" faults (e.g. errors in computation or corruption of messages), rather than the "hard" faults (total failure of a component and associated loss of data) that are expected at exascale.

Many have a centralized controller that manages the injection of faults on every node of the system—a method that will not scale to allow testing on very large systems.

Invention Embodiments

Figure 4:
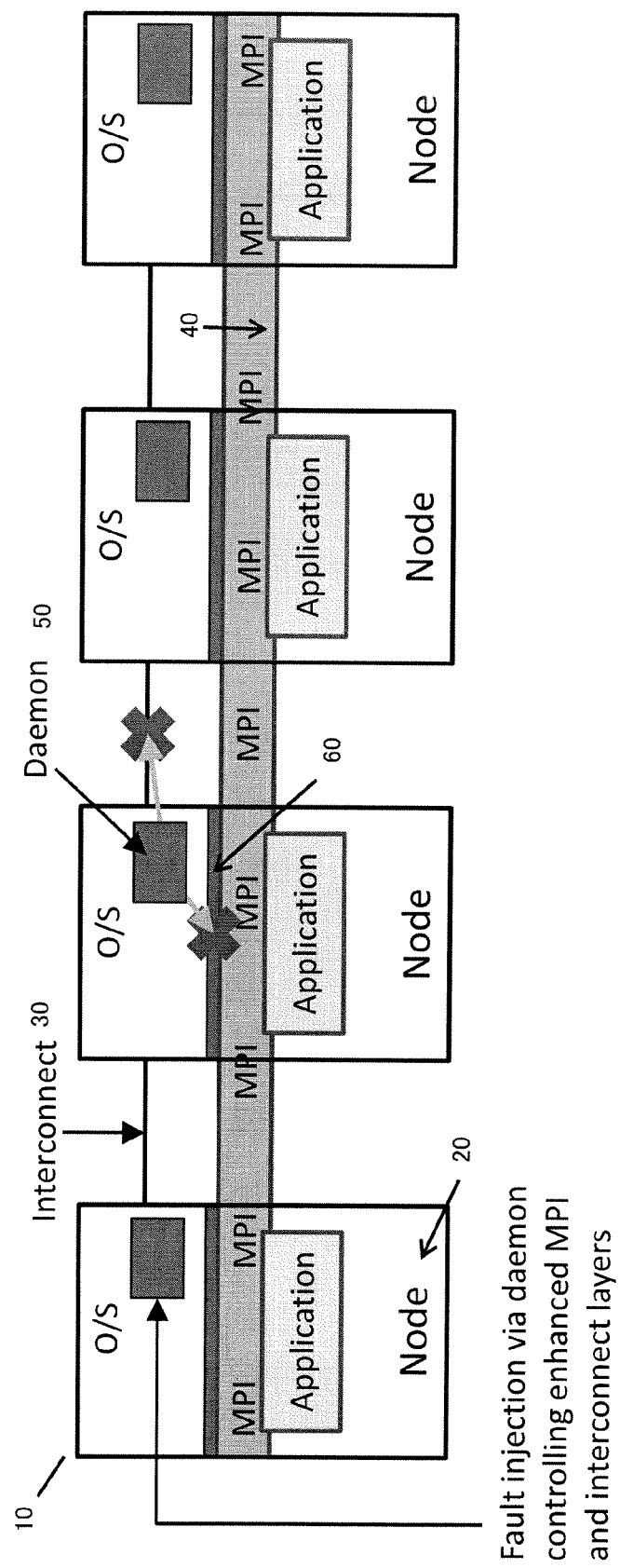
FIG. 4 is a schematic diagram of nodes linked by an interconnect illustrating a method according to invention embodiments.

Thus, there is still a requirement for a solution that is better suited for developing algorithms that are resilient to the faults expected in distributed computing systems, particularly at exascale. An arrangement according to invention embodiments is illustrated in FIG. 4. FIG. 4 is an overview of a system used for daemon-based fault injection depicted on the same background structure as FIGS. 2 and 3. Description of parts already mentioned is omitted here for brevity.

Daemons 50 running on each node determine when a fault occurs (according to a statistical model) and these are injected either into the O/S (e.g. to trigger shut down of a node) or into enhanced versions of the libraries that interface with potentially faulty hardware components (these libraries are loaded transparently to the application using LD_PRELOAD). Additional components (daemon and enhanced library functionality 60) compared to the standard software stack are shown in darker shading.

In this embodiment, daemons run independently on each node and determine when and what types of faults occur according to a statistical model. Enhanced versions of the O/S and the libraries that interface with potentially faulty hardware components (e.g. interconnect, disk, memory) are loaded transparently to the application using the LD_PRELOAD environment variable. These enhanced libraries function identically to the standard software stack except that they include modifications to allow the hardware component to be deactivated (or to have its performance degraded) following a trigger from the daemon.

To the application, the resulting fault would be indistinguishable from an actual fault in the hardware component managed by the library. Further, faults on each node occur independently of one another and each node is only able to detect (and respond to) a failure elsewhere in the system as a result of failed communication. Again, this is consistent with what would happen on a real exascale system. The daemons on each node will also keep a record of what faults were injected when in order that the same fault scenario can be replayed multiple times in order to test new methods for increasing the resilience of the application to a specific scenario.

FIG. 5 is an overview flow chart of a general method according to invention embodiments. In step S10 an enhanced software stack is loaded. That is, some part of the software stack or all of the software stack may be enhanced. The loading may be dynamic (during execution of the application) or static.

In step S20 a daemon is run on each node. The skilled reader will appreciate that other arrangements are possible. For example in some unusual embodiments a daemon may be run on a subset of nodes, for example every other node.

In some cases steps S10 and S20 may be carried out in parallel, or partially in parallel, for example if a dynamic linker is used.

In step S30 one of the daemons provides a fault trigger during execution of the application. Of course additional faults may be injected at the same time, for example to simulate a more wide-spread failure. The fault trigger may be injected via the enhanced software stack (for example via an enhanced library or the enhanced operating system if it is enhanced). In some embodiments however, not every fault trigger uses the enhanced software stack. For example, the fault trigger may be provided via the normal operating system if no enhancement is required for that particular fault.

In step S40 execution of the application continues. Further triggers may be provided for the same or different daemons, as also shown in the diagram.

The Software Stack

The software stack includes enhanced (or modified) libraries. The standard libraries already control the hardware (that is their function). However, they do not contain features to "break" the hardware (when prompted by the daemon) since (a) there is not really a use-case for this in normal operation; and (b) the daemon is not part of a standard system.

There are many examples of hardware component performance and functionality degradation that may be created using invention embodiments, affecting, for instance, a core or one "leg" of the interconnect. As most modern CPUs are multi-core, a failure in one physical core will not necessarily lead to a complete failure of a node, but will degrade its performance (since there is now one fewer core to do the necessary computation).

Thus the enhanced libraries do not interact in a fundamentally different manner with the hardware from the standard libraries but they (may) prompt it to do different things than the standard library would via the same library call. For example, whereas a call to the standard MPI_Send( ) routine would cause a message to be sent, the enhanced library may contain a different version of MPI_Send( ) which will generally prompt the hardware to send the message but (in the case of fault injected by the daemon) may instead cause the hardware to do nothing (missing message), to send the message to the wrong place, to send a corrupted version of the message or to send the message after a short delay. These are equivalent to hardware-level problems.

Similarly, interconnects are generally built with some level of redundancy (so messages can be sent by different routes in the event of a failure). So, a failure in one section may not lead to total failure of the interconnect. However, its performance is likely to be reduced if messages have to be sent via a more circuitous route (or multiple messages are competing for reduced bandwidth).

Any library that interacts with hardware within the computer system could be enhanced and some examples are provided below. MPI is the most obvious example, because it (at least partly) controls the interconnect but the exact libraries that are enhanced will depend on the hardware available (and may change over time). For example, very different libraries may be used on a SPARC-based system than on an Intel-based cluster running Linux.

Libraries other than MPI can be used to control the interconnect and thus may be enhanced, e.g. there are various libib* libraries (e.g.libibverbs, libibcm) that control infiniBand interconnects. Another example would be the use of liblustre to control a lustre file system (although for a system running Linux this might be more likely to be carried out via the O/S). The C runtime library (libc) could be modified by specifying alternative version of, e.g., malloc or free in order to corrupt the local memory. It may also be possible to modify libraries such as hwloc or pthreads to hide hardware from the application (i.e. give the appearance of a fault). The skilled person will appreciate that these are just a few of many different possibilities.

FIG. 6 depicts two flow charts showing a comparison between no fault injection and daemon-based fault injection to give a more specific embodiment of how the invention can work.

In the left-hand flow chart there is no fault injection and the application library and hardware therefore function normally. In step S100 the application makes a library call and in step S110 the library passes the instruction to the hardware. In step S120 the hardware carries out the instruction.

In the right-hand flow chart, use of a modified or enhanced library allows daemon-based fault injection. In step S130 the application makes a library call, exactly as in the standard method. If the library call is passed to a standard library, the standard library passes the instruction to the hardware in step S140 and the hardware carries out the instruction with no fault inserted in step S150.

On the other hand if the call is linked to a modified library, this effectively intercepts the call to the standard library in step S160. In step S170, the statistical model in the daemon determines whether faults are to be injected into the modified library. In step S180 the library injects any triggered fault into the hardware. The modified version of the libraries may contain "hooks" to interact with the daemon. So, for example, each standard library call may be in an if-statement (e.g. if (daemon.hasnofault( )) then normal execution), with an else-statement to cover the case where the daemon does inject a fault. Thus, the interaction is reactive: when the library has to do something it first queries the daemon to see if there has been a fault injected.

S180 shows the library making the if-else decision referred to in the previous paragraph about whether to proceed with normal execution (in the case of no faults) or to carry out a modified function call (e.g. sending the message to the wrong place) following a daemon-injected fault.

If no fault is injected in step S180 the original instruction is passed to hardware in step S190 and the hardware carries out the instruction with no fault as before in step S150.

On the other hand, if a fault is injected in step S180 the modified instruction is passed to hardware in step S200 and the hardware carries out a different instruction from that expected by the application in step S210 to result in a fault.

Invention embodiments may incorporate any of the following advantages:

The use of LD_PRELOAD or similar functionality to replace standard libraries interfacing with hardware components with enhanced versions that are capable of disabling parts of the hardware in response to triggers from the daemon.

This can allow an application to be run in the presence of faults with no modification to its source code or to the way in which it is configured, compiled or executed.

The use of a daemon (essentially software-based) running independently of the fault-resilient application under development to inject hardware-level faults directly into a real HPC system in a controllable fashion. Existing solutions are more limited:

Hardware-based methods: These inject faults in an uncontrollable fashion and may cause permanent damage to the system being used. Invention embodiments can overcome that limitation.

Software-based methods: These require modification to the source code of the fault-resilient application under development and can generally only inject faults in a limited set of injection instances (which may not cover all parts of the application code). Invention embodiments do not suffer from such limitations.

Other daemon-based methods (e.g. FAIL-FCI) require the application to be run via a debugger. The daemon injects faults into the software via the debugger (i.e. software is used to simulate hardware-level faults). In contrast, invention embodiments propose introducing real hardware-level faults.

Minimally invasive: daemons on each node can run independently of one another. Faults on one node may only become visible to other nodes indirectly (e.g. via physical failure of a message to be received). This ensures that the solution is scalable and that the injected faults manifest themselves within the application in the same way as real faults would.

Capability to recover nodes following a fault in addition to injecting faults. By allowing software to control hardware the daemon may have the ability to shut down a node, then (optionally) reboot it (possibly after some time delay) in order to recreate the impact of a node suffering a fault from which it is capable of recovering from. This node could then be re-used by the running application.

Embodiments can have any or all of the following benefits over the existing state-of-the-art:

The use of a daemon running within the O/S that can control the behaviour of hardware allows for a wider range of faults to be injected (compared with software-based methods) without the risk of damaging the system (resulting from hardware-based methods).

The use of the daemon allows the same faulty behaviour (at the hardware level) to be reproduced in subsequent runs. Therefore, repeated tests to verify that a proposed solution is resilient to the fault under consideration can be carried out.

The daemon has the capability to restart hardware components following an injected fault, whereas typical hardware-based fault injectors result in permanent failure of the node. This allows testing of algorithms that are able to reuse a recovered node (and provides a realistic time-frame for restart compared to software-based injectors that must simulate the down-time of the node).

In contrast to other software-based fault injection methods, no source-code modifications are required in the fault-resilient application to be tested and the application does not have to be run via a debugger. This also has the advantage that any application can be tested in the presence of faults (including those for which only a binary version—which may not have debugging available—is available).

Ability to test all components of a fault-resilient application, i.e. both the ability to continue to run in the presence of a fault and the ability to use recovered nodes as they come back online in order to maintain expected performance levels (an application that uses progressively fewer nodes as faults occur may be fault-resilient but will suffer a—possibly unacceptable—degradation in performance.).

Low performance overhead: typically O/Ss run several background processes on each node. Adding an additional daemon to these should not have a large performance impact.

SUMMARY

Invention embodiments provide a testbed for fault-resilient algorithms and software being developed for HPC and exascale computing. Exascale supercomputers will experience component failure much more frequently than current high performance computing (HPC) systems. Thus, it is necessary to develop fault-resilient methods to allow the application to deal with these failures. Invention embodiments propose a new method for emulating the faults that are expected on an exascale system, which may be used on today's much smaller (and more reliable) systems.

The invention claimed is:

1. A method of injecting hardware faults into execution of an application in a distributed computing system comprising hardware components including linked nodes, the method comprising:
loading an enhanced software stack allowing faults to be injected by one of deactivating and degrading hardware components as a result of fault triggers;
running a fault-trigger daemon on each of the nodes;
providing the fault trigger for one of a degradation and a deactivation using one of daemons to trigger a layer of the software stack controlling a hardware component to inject a fault into the hardware component; and
continuing execution of the application with the fault that has been injected.

2. A method according to claim 1, wherein each daemon runs as a background process on a corresponding node within the operating system.

3. A method according to claim 1, wherein the fault is injected completely independently of application execution.

4. A method according to claim 1, wherein the enhanced software stack includes an enhanced version of a library controlling a hardware component for the application and the daemon triggers the library controlling the hardware component to inject the fault.

5. A method according to claim 1, wherein the enhanced software stack includes an enhanced version of an operating system for the application and the daemon triggers the operating system which controls the hardware to inject the fault.

6. A method according to claim 1, wherein the daemons run independently of each other and independently of any central control.

7. A method according to claim 1, wherein the daemons are controlled by one or more files that indicate what fault(s) should be injected on the nodes on which the daemons are running.

8. A method according to claim 1, wherein each daemon keeps a record of what fault(s) each daemon injects.

9. A method according to claim 1, wherein each daemon determines when a fault occurs using a statistical model.

10. A method according to claim 1, wherein each daemon controls an enhanced message interface, such as one of an enhanced message passing interface (MPI) and enhanced interconnect layers to inject the fault.

11. A method according to claim 1, wherein each daemon provides a recovery trigger after a fault trigger to instruct a recovery of the one of the degraded and de-activated hardware component.

12. A method according to claim 11, wherein the recovery trigger is provided by the daemon after a time delay.

13. A method according to claim 1, wherein the fault injection is carried out without modification to source code of the application and without modification to any of a configuration, compilation and execution of the application.

14. A method according to claim 1, wherein the enhanced software stack is one of loaded statically and dynamically by a dynamic linker using a modified list of locations to search for libraries, with the modified list of locations specified by LD_PRELOAD.

15. A distributed computing system comprising hardware components and a software stack allowing a method of injecting hardware faults into an executing application; the distributed computing system comprising
 nodes linked to an interconnect;
 an enhanced version of a software stack for the application, which is operable to allow one or more hardware components to be one of deactivated and degraded following a fault trigger; and
 a daemon associated with each single node, each daemon being operable to provide the fault trigger for one of a degradation and a deactivation by triggering a layer of the software stack controlling a hardware component to inject a fault into the hardware component.

16. A fault-trigger daemon operable on a single node of a distributed computing system comprising hardware components including linked nodes, the computing system being arranged to carry out a method of injecting hardware faults into execution of an application, where the daemon is operable to provide a fault trigger for one of a degradation and a deactivation of a hardware component, by triggering a part of the software stack to one of deactivate and degrade a hardware component that the part of the software stack is controlling.

17. A software stack for use with an application and including an operating system layer and at least one library layer controlling hardware of a distributed computing system comprising hardware components including link nodes, where one of the library layer and operating system are enhanced to allow injection of hardware faults into execution of the application using a fault-trigger daemon operable on a single node of the computing system, the daemon providing a fault trigger for one of degradation and deactivation of a hardware component.

* * * * *